US009681309B2

(12) United States Patent
Raghavan et al.

(10) Patent No.: US 9,681,309 B2
(45) Date of Patent: Jun. 13, 2017

(54) METHODS EXPLOITING ASYMMETRIC CAPABILITIES FOR CONTENTION-BASED RANDOM ACCESS IN MM-WAVE ACCESS SYSTEMS

(71) Applicant: QUALCOMM Incorporated, San Diego, CA (US)

(72) Inventors: Vasanthan Raghavan, North Brunswick, NJ (US); Sundar Subramanian, Bridgewater, NJ (US); Junyi Li, Chester, NJ (US); Ashwin Sampath, Skillman, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 429 days.

(21) Appl. No.: 14/452,510

(22) Filed: Aug. 5, 2014

(65) Prior Publication Data

US 2016/0044517 A1    Feb. 11, 2016

(51) Int. Cl.

| | |
|---|---|
| *H04W 16/28* | (2009.01) |
| *H04W 72/04* | (2009.01) |
| *H04W 48/16* | (2009.01) |
| *H04W 76/02* | (2009.01) |
| *H04B 7/04* | (2017.01) |
| *H04B 7/06* | (2006.01) |
| *H04B 7/08* | (2006.01) |

(52) U.S. Cl.
CPC ............ *H04W 16/28* (2013.01); *H04B 7/046* (2013.01); *H04B 7/0617* (2013.01); *H04B 7/0695* (2013.01); *H04B 7/088* (2013.01); *H04W 48/16* (2013.01); *H04W 72/046* (2013.01); *H04W 76/025* (2013.01)

(58) Field of Classification Search
None
See application file for complete search history.

(56) References Cited

U.S. PATENT DOCUMENTS

| | | | |
|---|---|---|---|
| 8,184,052 B1 * | 5/2012 | Wu ...................... | H01Q 3/2605 342/368 |
| 8,615,050 B2 | 12/2013 | Lakkis | |

(Continued)

FOREIGN PATENT DOCUMENTS

WO    2013025070 A2    2/2013

OTHER PUBLICATIONS

International Search Report and Written Opinion—PCT/US2015/038770—ISA/EPO—Sep. 10, 2015.

*Primary Examiner* — Shaq Taha
*Assistant Examiner* — Ronald h Davis
(74) *Attorney, Agent, or Firm* — Arent Fox, LLP

(57) ABSTRACT

A method, an apparatus, and a computer program product for operating a user equipment (UE) are provided. The apparatus receives beamforming capability information indicating one of at least a digital, analog, or hybrid beamforming capability, the beamforming capability associated with a millimeter wave base station (mmW-BS). Based on the beamforming capability information, the apparatus scans N transmit beams from the mmW-BS for each of M receive beam directions of the UE, determines one or more preferred scanned beams from among the N transmit beams, and establishes a wireless communication link with the mmW-BS based on the preferred one or more scanned beams.

28 Claims, 11 Drawing Sheets

(56) References Cited

U.S. PATENT DOCUMENTS

| | | | |
|---|---|---|---|
| 2008/0014892 A1* | 1/2008 | Aldana | H04B 7/0691 |
| | | | 455/277.1 |
| 2008/0095268 A1* | 4/2008 | Aldana | H04B 7/0691 |
| | | | 375/299 |
| 2008/0204319 A1* | 8/2008 | Niu | H01Q 3/26 |
| | | | 342/368 |
| 2009/0046010 A1* | 2/2009 | Niu | H04B 7/0691 |
| | | | 342/373 |
| 2009/0046012 A1* | 2/2009 | Niu | H04B 7/0691 |
| | | | 342/377 |
| 2009/0121936 A1* | 5/2009 | Maltsev | H01Q 3/2605 |
| | | | 342/377 |
| 2011/0273977 A1* | 11/2011 | Shapira | H04B 7/0452 |
| | | | 370/208 |
| 2012/0320874 A1 | 12/2012 | Li et al. | |
| 2012/0328034 A1* | 12/2012 | Nabar | H04B 7/0617 |
| | | | 375/260 |
| 2013/0155847 A1 | 6/2013 | Li et al. | |
| 2013/0163705 A1* | 6/2013 | Stirland | H01Q 3/26 |
| | | | 375/346 |
| 2013/0301454 A1 | 11/2013 | Seol et al. | |
| 2014/0044044 A1 | 2/2014 | Josiam et al. | |
| 2014/0072078 A1 | 3/2014 | Sergeyev et al. | |
| 2016/0080051 A1* | 3/2016 | Sajadieh | H04B 7/0456 |
| | | | 375/267 |
| 2016/0353294 A1* | 12/2016 | Wang | H04W 24/02 |

\* cited by examiner

METHODS EXPLOITING ASYMMETRIC CAPABILITIES FOR CONTENTION-BASED RANDOM ACCESS IN MM-WAVE ACCESS SYSTEMS

BACKGROUND

Field

The present disclosure relates generally to communication systems, and more particularly, to methods exploiting asymmetric capabilities for contention-based random access in millimeter wave (mmW) access systems.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, total communication time, etc.). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus receives beamforming capability information indicating one of at least a digital, analog, or hybrid beamforming capability, the beamforming capability associated with a millimeter wave base station (mmW-BS). Based on the beamforming capability information, the apparatus scans N transmit beams from the mmW-BS for each of M receive beam directions of the UE, determines one or more preferred scanned beams from among the N transmit beams, and establishes a wireless communication link with the mmW-BS based on the preferred one or more scanned beams.

DETAILED DESCRIPTION

Figure 1:
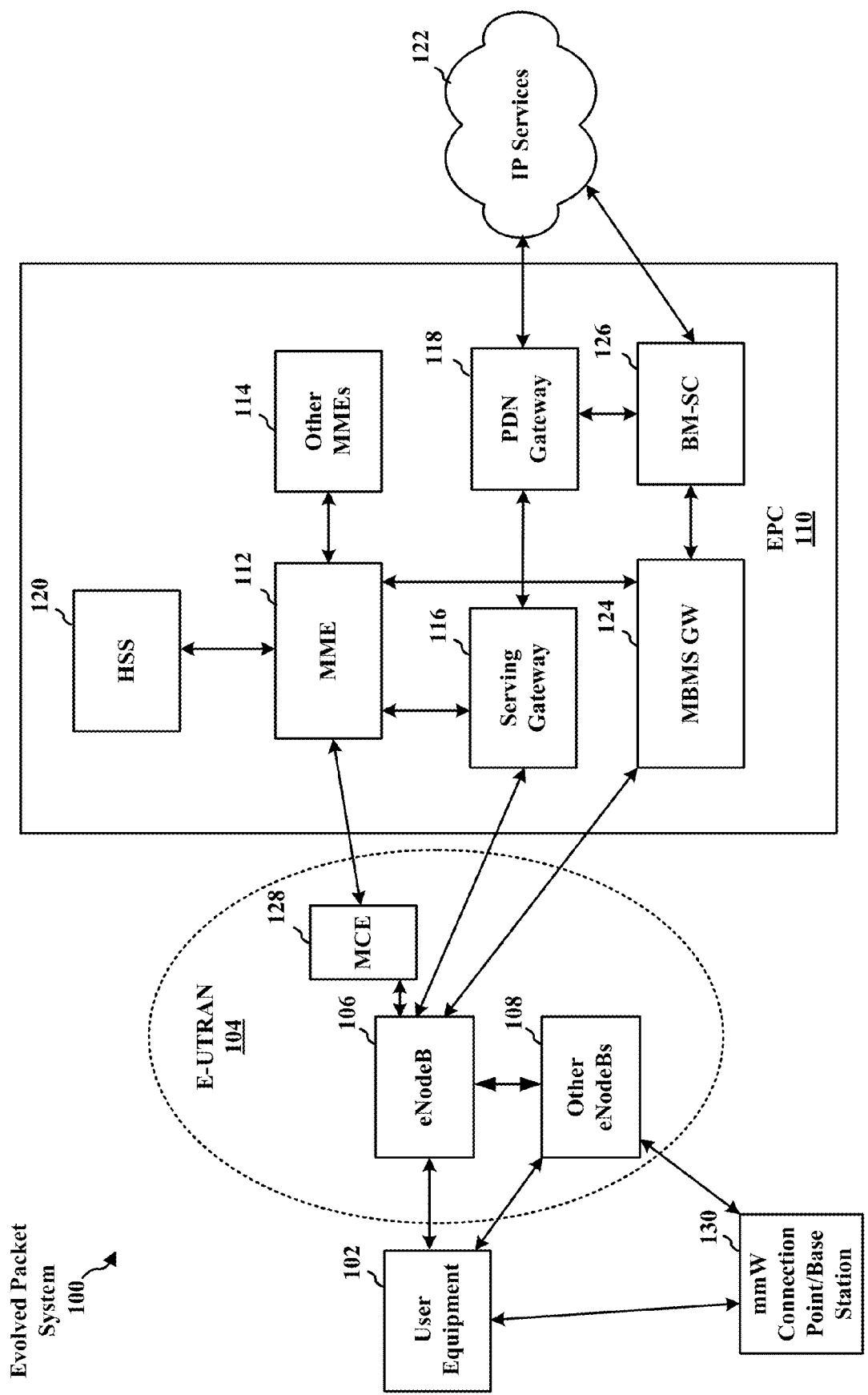
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

In an aspect, the UE 102 is capable of communicating signals via the LTE network and a millimeter wave (mmW) system. Accordingly, the UE 102 may communicate with the eNB 106 and/or the other eNBs 108 over a LTE Additionally, the UE 102 may communicate with a connection point (CP) or base station (BS) or mmW base station (mmW-BS) 130 (capable of mmW system communication) over a mmW link.

In a further aspect, at least one of the other eNBs 108 may be capable of communicating signals via the LTE network and the mmW system. As such, an eNB 108 may be referred to as a LTE+mmW eNB. In another aspect, the CP/BS/mmW-BS 130 may be capable of communicating signals via the LTE network and the mmW system. As such, the CP/BS/mmW-BS 130 may be referred to as a LTE+mmW CP/BS. The UE 102 may communicate with the other eNB 108 over a LTE link as well as over a mmW link.

In yet another aspect, the other eNB 108 may be capable of communicating signals via the LTE network and the mmW system, while the CP/BS 130 is capable of communicating signals via the mmW system only. Accordingly, the CP/BS 130 unable to signal the other eNB 108 via the LTE network may communicate with the other eNB 108 over a mmW backhaul link.

Figure 2:
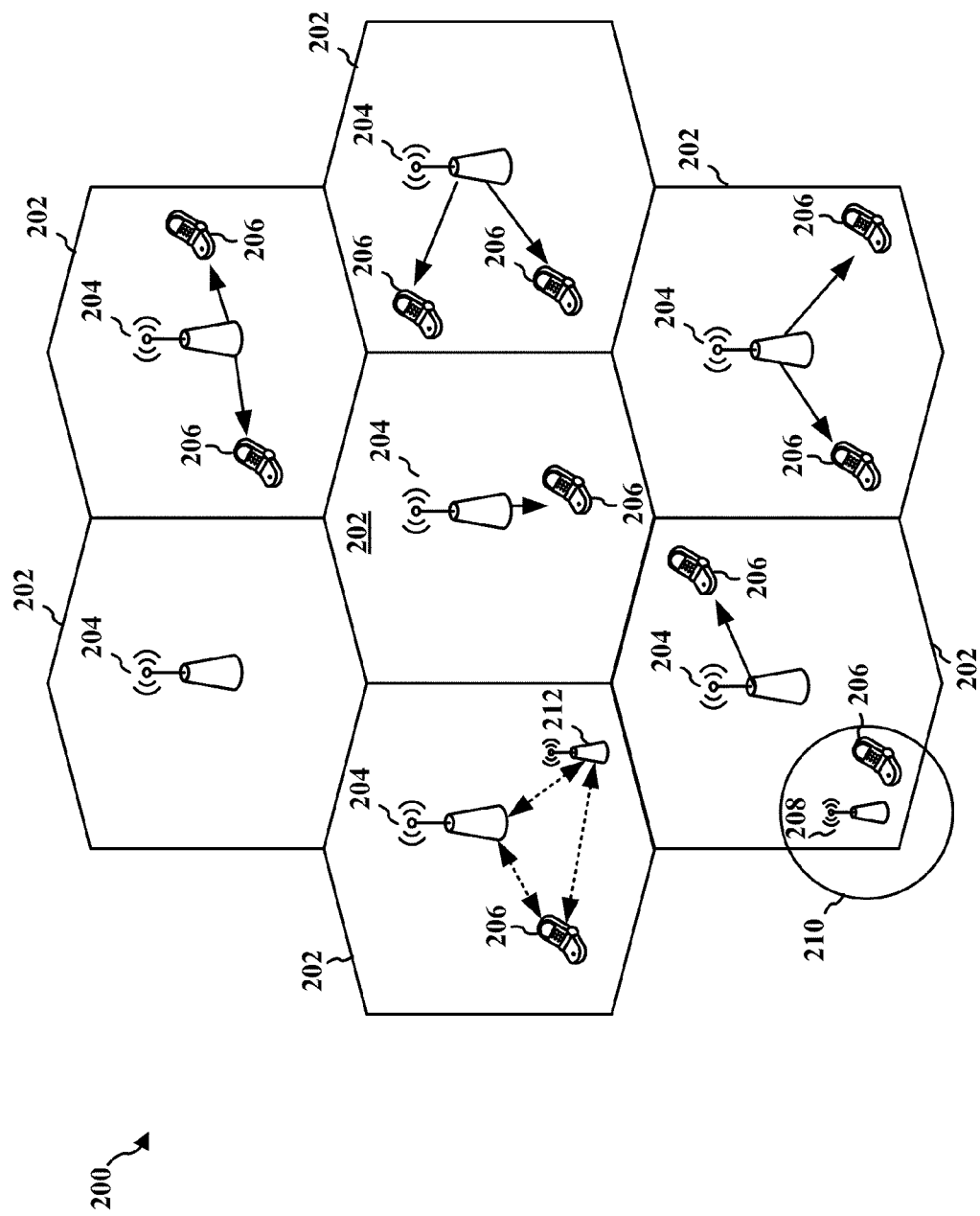
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving are particular coverage area. Further, the terms "eNB," "base station," and "cell" may be used interchangeably herein.

In an aspect, the UE 206 may communicate signals via the LTE network and a millimeter wave (mmW) system. Accordingly, the UE 206 may communicate with the eNB 204 over a LTE link and communicate with a CP or BS 212 (capable of mmW system communication) over a mmW link. In a further aspect, the eNB 204 and the CP/BS/mmW-BS 212 may communicate signals via the LTE network and the mmW system. As such, the UE 206 may communicate with the eNB 204 over a LTE link and a mmW link (when the eNB 204 is capable of mmW system communication), or communicate with the CP/BS 212 over a mmW link and a LTE link (when the CP/BS/mmW-BS 212 is capable of LTE network communication). In yet another aspect, the eNB 204 communicates signals via the LTE network and the mmW system, while the CP/BS/mmW-BS 212 communicates signals via the mmW system only. Accordingly, the CP/BS/mmW-BS 212 unable to signal the eNB 204 via the LTE network may communicate with the eNB 204 over a mmW backhaul link.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
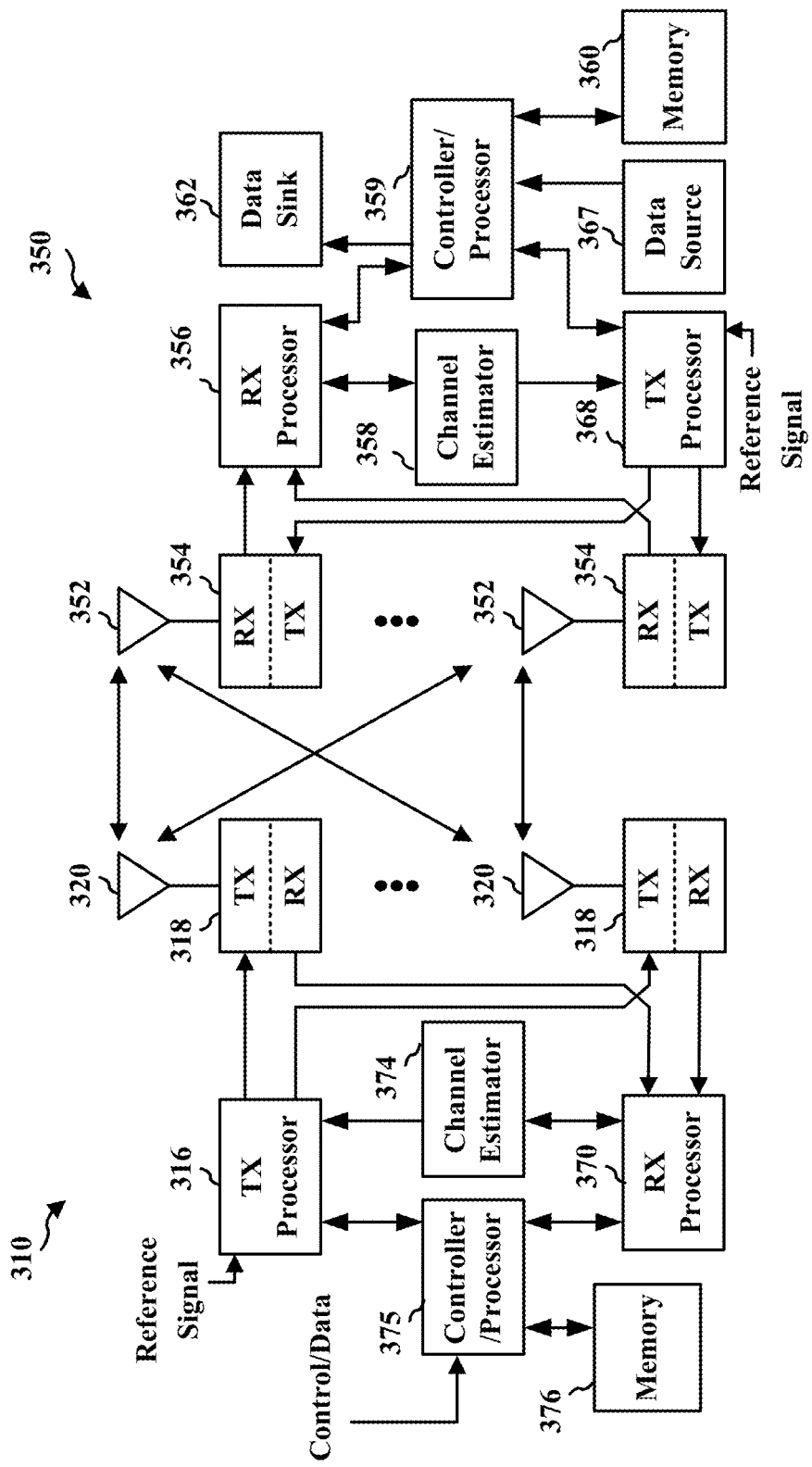
FIG. 3 is a diagram illustrating an example of an evolved Node B and user equipment in an access network.

FIG. 3 is a block diagram of a base station 310 in communication with a UE 350 in an access network. The base station 310 may be, for example, an eNB of a LTE system, a CP/access point/base station of an mmW system, an eNB capable of communicating signals via the LTE system and the mmW system, or a CP/access point/base station capable of communicating signals via the LTE system and the mmW system. The UE 350 may be capable of communicating signals via the LTE system and/or the mmW system. In the DL, upper layer packets from the core network are provided to a controller/processor 375. In the DL, the controller/processor 375 provides header compression, ciphering, packet segmentation and reordering, multiplexing between logical and transport channels, and radio resource allocations to the UE 350 based on various priority metrics. The controller/processor 375 is also responsible for HARQ operations, retransmission of lost packets, and signaling to the UE 350.

The transmit (TX) processor 316 implements various signal processing functions. The signal processing functions include coding and interleaving to facilitate forward error correction (FEC) at the UE 350 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to receive (RX) processor 356. The RX processor 356 implements various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub carrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359.

The controller/processor 359 can be associated with a memory 360 that stores program codes and data. The memory 360 may be referred to as a computer-readable medium. In the DL, the controller/processor 359 provides demultiplexing between transport and logical channels, packet reassembly, deciphering, header decompression, control signal processing to recover upper layer packets from the core network. The upper layer packets are then provided to a data sink 362. Various control signals may also be provided to the data sink 362. The controller/processor 359 is also responsible for error detection using an acknowledgement (ACK) and/or negative acknowledgement (NACK) protocol to support HARQ operations.

In the UL, a data source 367 is used to provide upper layer packets to the controller/processor 359. Similar to the functionality described in connection with the DL transmission by the base station 310, the controller/processor 359 provides header compression, ciphering, packet segmentation and reordering, and multiplexing between logical and transport channels based on radio resource allocations by the base station 310. The controller/processor 359 is also responsible for HARQ operations, retransmission of lost packets, and signaling to the base station 310.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318 RX receives a signal through its respective antenna 320. Each receiver 318 RX recovers information modulated onto an RF carrier and provides the information to a RX processor 370.

The controller/processor 375 can be associated with a memory 376 that stores program codes and data. The memory 376 may be referred to as a computer-readable medium. In the UL, the control/processor 375 provides demultiplexing between transport and logical channels, packet reassembly, deciphering, header decompression, control signal processing to recover upper layer packets from the UE 350. Upper layer packets from the controller/processor 375 may be provided to the core network. The controller/processor 375 is also responsible for error detection using an ACK and/or NACK protocol to support HARQ operations.

Figure 4:
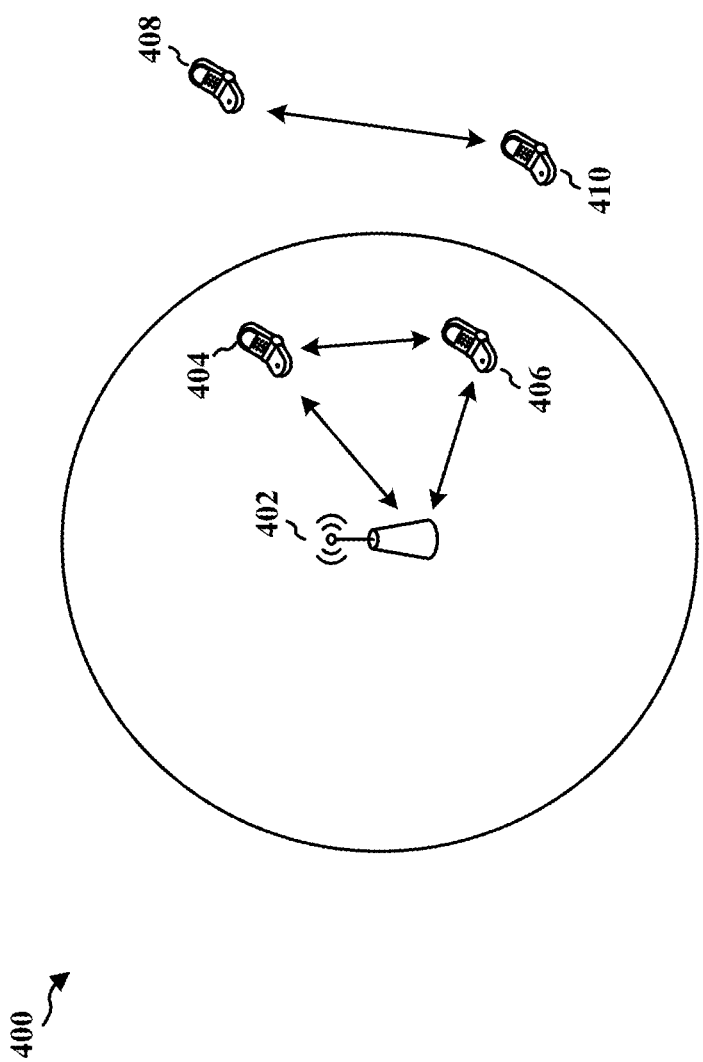
FIG. 4 is a diagram of a device-to-device communications system.

FIG. 4 is a diagram of a device-to-device communications system 400. The device-to-device communications system 400 includes a plurality of wireless devices 404, 406, 408, 410. The device-to-device communications system 400 may overlap with a cellular communications system, such as for example, a wireless wide area network (WWAN). Some of the wireless devices 404, 406, 408, 410 may communicate together in device-to-device communication using the DL/UL WWAN spectrum, some may communicate with the base station 402, and some may do both. For example, as shown in FIG. 4, the wireless devices 408, 410 are in device-to-device communication and the wireless devices 404, 406 are in device-to-device communication. The wireless devices 404, 406 are also communicating with the base station 402.

The exemplary methods and apparatuses discussed infra are applicable to any of a variety of wireless device-to-device communications systems, such as for example, a wireless device-to-device communication system based on FlashLinQ, WiMedia, Bluetooth, ZigBee, or Wi-Fi based on the IEEE 802.11 standard. To simplify the discussion, the exemplary methods and apparatus are discussed within the context of LTE. However, one of ordinary skill in the art would understand that the exemplary methods and apparatuses are applicable more generally to a variety of other wireless device-to-device communication systems.

An mmW communication system (also referred to as an mmW access system) may operate at very high frequency bands (e.g., 10.0 GHz to 300.0 GHz) where the carrier wavelength is on the order of a few millimeters. Such an mmW communication systems may allow a large number of antennas to be packed in a given area as compared to low-frequency carrier systems (e.g., below 6.0 GHz). In an aspect, data exchange in an mmW communication system between an mmW-BS and a UE may be achieved through the use of a beamforming scheme. For example, the beamforming scheme may be a method for performing physically-motivated directional steering that provides an array gain accumulated from multiple antennas.

To initiate data exchange in an mmW communication system, a UE may need to discover all mmW-BSs in the vicinity of the UE and to associate with an mmW-BS based on signal quality or other UE-specific considerations. In an aspect, the association procedure (also referred to as synchronization procedure or a beam search procedure) between the UE and the mmW-BS may be achieved by the UE transmitting on a particular channel, such as a random access channel (RACH), that has a well-defined set of signals, such as Primary Synchronization Signal (PSS) and a Secondary Synchronization Signal (SSS). For example, the synchronization process between the UE and the mmW-BS may allow the UE to obtain information of interest, such as a cell frame timing, a carrier frequency offset, an OFDM symbol timing, and/or a cell id.

In low-frequency communication systems (e.g., an LTE wireless communication system), the signals used in a RACH process are fixed and have no bearing or dependence on the physical environment. In mmW wireless communication systems, however, the directional nature of the signaling may require a directional random access procedure to be performed on the RACH channel between the UE and the mmW-BS. For example, an mmW-BS may send a sector/beamforming vector index corresponding to a predefined beam direction through the Master Information Block (MIB). The UE may send a RACH signal on the uplink when the UE determines a preferred direction for a transmitting or receiving a beam.

In an aspect, an mmW-BS and a UE in an mmW communication system may have different capabilities (also referred to as asymmetric capabilities). For example, the mmW-BS and the UE may have a different number of antennas, a different number of antenna sub-arrays, different types of sub-arrays (linear, planar, etc.), different beamformer architecture types (e.g., digital, analog/RF, hybrid), and/or different transmit power. As discussed infra, such differences in capabilities between the mmW-BS and the UE may be leveraged to efficiently implement a random access procedure.

In another aspect, a first UE (e.g., wireless device 404) and a second UE (e.g., wireless device 406) may be configured for device-to-device communications in an mmW system and may have different capabilities. For example, the first UE and the second UE may have a different number of antennas, a different number of antenna sub-arrays, different types of sub-arrays (linear, planar, etc.), different beamformer architecture types (e.g., digital, analog/RF, hybrid), and/or different transmit power. Such differences in capabilities between the first UE and second UE may be leveraged to efficiently implement a RACH procedure between the first and second UEs.

Figure 5:
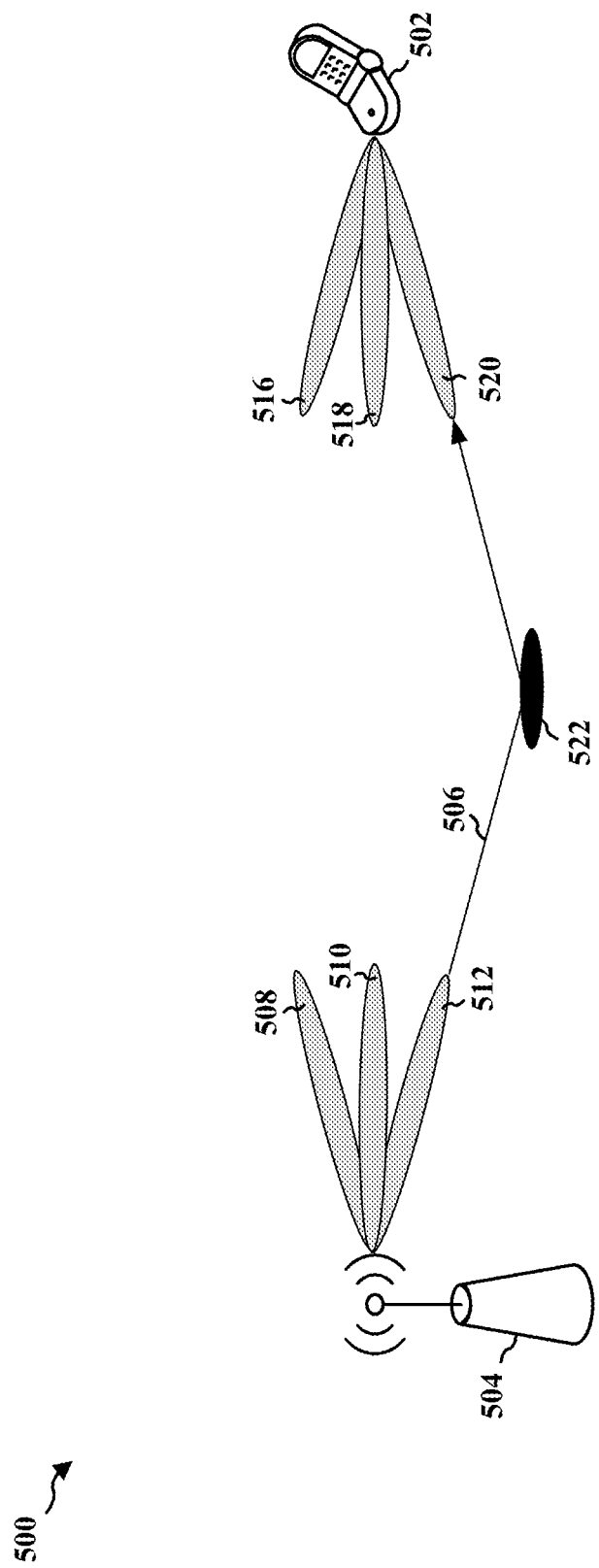
FIG. 5 is a diagram illustrating an example of an mmW wireless communication system.

FIG. 5 is a diagram illustrating an example of an mmW communication system 500. The mmW communication system 500 includes UE 502 and mmW-BS 504. In an aspect, the UE 502 and mmW-BS 504 may perform a synchronization procedure and discovery to establish a communication link. For example, the UE 502 and the mmW-BS 504 may establish a communication link along path 506 that reflects from surface 522.

In an aspect, the UE 502 and/or the mmW-BS 504 may have one or more beamforming capabilities that may facilitate the synchronization procedure. In an aspect, the beamforming capability may be that one device in the mmW communication system 500 has a greater number of antennas than another device in the mmW communication system 500. For example, the mmW-BS 504 may have a greater number of antennas than the UE 502. This differential in the number of antennas between the UE 502 and the mmW-BS 504 may allow the mmW-BS 504 to scan through more directions and/or sectors within a time slot than the UE 502 for purposes of learning the respective direction of beams. For example, the mmW-BS 504 may use its greater number of antennas to scan each of its possible beamforming angles (e.g., the angles corresponding to beams 508, 510, and/or 512) more rapidly than the UE 502 can scan each of its possible beamforming angles (e.g., the angles corresponding to beams 516, 518, and/or 520) in a given time slot.

In an aspect, the beamforming capability may be an analog beamforming capability. For example, the mmW-BS 504 may have analog beamforming capability that may allow the mmW-BS 504 to transmit a single beam (e.g., beam 512 along path 506) through one available RF chain at a time. The term RF chain refers to a combination of power amplifier, digital to analog converter, and a mixer when referring to the transmit side of a modem or to a combination of a low noise amplifier, demixer, and an analog to digital converter when referring to the receiver side of a modem. In an aspect, the beamforming capability may be a digital beamforming capability. For example, the mmW-BS 504 may have digital beamforming capability, corresponding to the same number of RF chains as the number of antennas, which may allow the mmW-BS 504 to concurrently transmit multiple beams (e.g., beams 510 and 512) by emitting electromagnetic energy in multiple directions at the expense of peak gain of each beam. In an aspect, the beamforming capability may be a hybrid beamforming capability. In an aspect, hybrid beamforming capability may be achieved by configuring a device to include multiple RF chains, where the number of the multiple RF chains is less than the number of antennas of the device. For example, the mmW-BS 504 may apply hybrid beamforming capability by transmitting a beam from each of the RF chains of the mmW-BS 504. In an aspect, the beamforming capability at the UE may be an availability of multiple antenna sub-arrays. For example, the UE 502 may have multiple antenna sub-arrays to overcome RF obstructions, such as a hand or fingers or body of the user that may be inadvertently blocking the path of a beam. This sub-array diversity allows the UE 502 to transmit beams from each of the antenna sub-arrays in different directions (e.g., the respective directions of beams 518 and 520).

In an aspect, the UE 502 may have an N number of antennas and the mmW-BS 504 may have an NK number of antennas, where K>1. In such aspect, the mmW-BS 504 has beamforming capability in that the mmW-BS 504 has a greater number of antennas than the UE 502 by a factor K. As such, the mmW-BS 504 may search for beams over more directions than the UE 502 for a given time period. In another aspect, the mmW-BS 504 may scan an $N_B$ number of sectors and the UE 502 may scan an $N_U$ number of sectors, where $N_B > N_U$.

In an aspect, the UE 502 may determine a beam search procedure and an appropriate signaling framework between the UE 502 and the mmW-BS 504 based on the beamforming capability information associated with the UE 502 and/or the beamforming capability information associated with the mmW-BS 504. In an aspect, the UE 502 and the mmW-BS 504 may exchange beamforming capability information outside the mmW band. For example, two different frame structures for a beam search procedure (e.g., RACH process) may be available to the UE 502 depending on whether the mmW-504 has digital beamforming capability or whether the UE 502 has multiple antenna sub-array capability. In such example, the UE 502 may receive a bit from the mmW-BS 504 which allows the UE 502 to determine whether the digital beamforming capability of the mmW-BS 504 is to be leveraged (e.g., the bit is set to '1') or whether the digital beamforming capability of the mmW-BS 504 is not to be leveraged (e.g., the bit is set to '0'). In a first scenario, if the bit is set to '1', the mmW-BS 504 may concurrently beamform (e.g., transmit or receive multiple beams at the same time) along directions i and j using its digital beamformer. In a second scenario, if the bit is set to '0', the mmW-BS 504 may beamform (e.g., transmit or receive a single beam at a time) first along direction i and then along direction j. In an aspect, in either of these scenarios, the UE 502 may not be aware of the capabilities of the mmW-BS 504 and may beamform along all its directions to complete the RACH process. In an aspect, if the UE 502 has multiple sub-array capability, the UE 502 may beamform along two different directions to reduce the time required to complete the RACH process.

Figure 6:
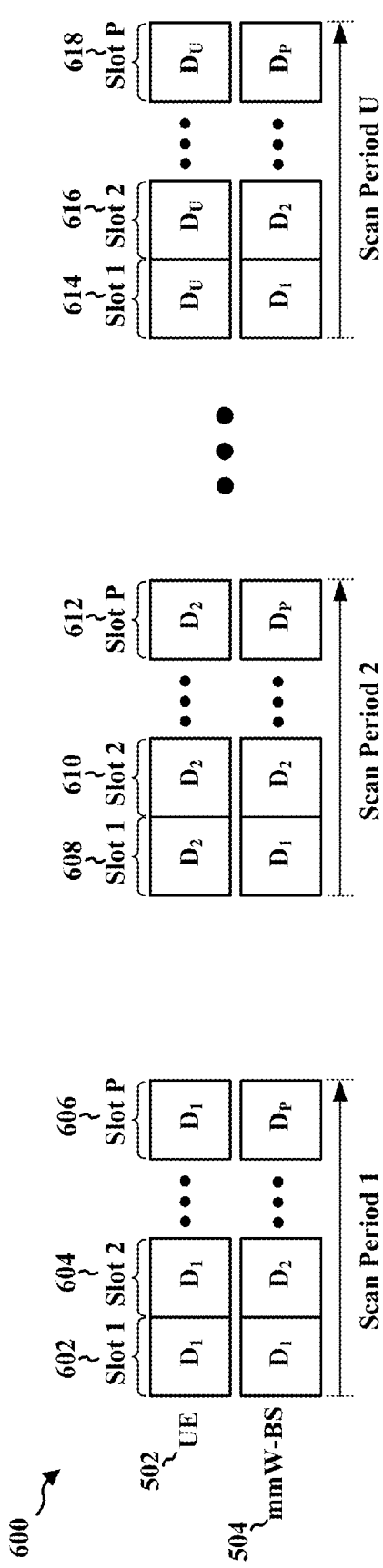
FIG. 6 is a diagram illustrating an example scanning operation for a UE and an mmW-BS.

FIG. 6 is a diagram illustrating an example frame structure 600 for a scanning operation of the UE 502 and the mmW-BS 504. In the aspect of FIG. 6, the UE 502 and the mmW-BS 504 may each have a single RF chain. As shown in FIG. 6, the UE 502 may transmit a beam in a single direction (e.g., direction "$D_1$") during each of a number of time slots (e.g., slot 1 602, slot 2 604, . . . , slot P 606). As further shown in FIG. 6, the mmW-BS 504 may scan each of its P number of possible directions (e.g., directions "$D_1$" to "$D_P$") during each of the corresponding time slots (e.g., slot 1 602, slot 2 604, . . . , slot P 606) to determine the best path for the beam from the UE 502. For example, each of the time slots (e.g., slot 1 602, slot 2 604, . . . , slot P 606) may have the same duration. In such example, the duration of scan period 1 in FIG. 6 may be equivalent to the total of the P time slots required for the mmW-BS 504 to scan each of its P directions.

The UE 502 may subsequently transmit a beam in another direction (e.g., direction "$D_2$") while the mmW-BS 504 scans each of its P number of possible directions to determine the best path for the beam from the UE 502. As shown in FIG. 6, the UE 502 may transmit a beam in a single direction (e.g., direction "$D_2$") during each of a number of time slots (e.g., slot 1 608, slot 2 610, . . . , slot P 612). As further shown in FIG. 6, the mmW-BS 504 may scan each of its P number of possible directions (e.g., directions "$D_1$" to "$D_P$") during each of the corresponding time slots (e.g., slot 1 608, slot 2 610, . . . , slot P 612) to determine the best path for the beam from the UE 502. For example, each of the time slots (e.g., slot 1 608, slot 2 610, . . . , slot P 612) may have the same duration. In such example, the duration of scan period 2 in FIG. 6 may be equivalent to the total of the P time slots required for the mmW-BS 504 to scan each of its P directions.

The UE 502 may transmit beams in the last direction of the U number of possible directions in a manner similar to the transmissions previously discussed with respect to the scan periods 1 and 2 in FIG. 6. For example, the UE 502 may transmit a beam in the last of its possible directions (e.g., direction "$D_U$") during each of the corresponding time slots (e.g., slot 1 614, slot 2 616, . . . , slot P 618). As further shown in FIG. 6, the mmW-BS 504 may scan each of its P number of possible directions (e.g., directions "$D_1$" to "$D_P$") during each of the corresponding time slots (e.g., slot 1 614, slot 2 616, . . . , slot P 618) to determine the best path for the beam from the UE 502. For example, each of the time slots (e.g., slot 1 614, slot 2 616, . . . , slot P 618) may have the same duration. In such example, the duration of scan period U in FIG. 6 may be equivalent to the total of the P time slots required for the mmW-BS 504 to scan each of its P directions.

Figure 7:
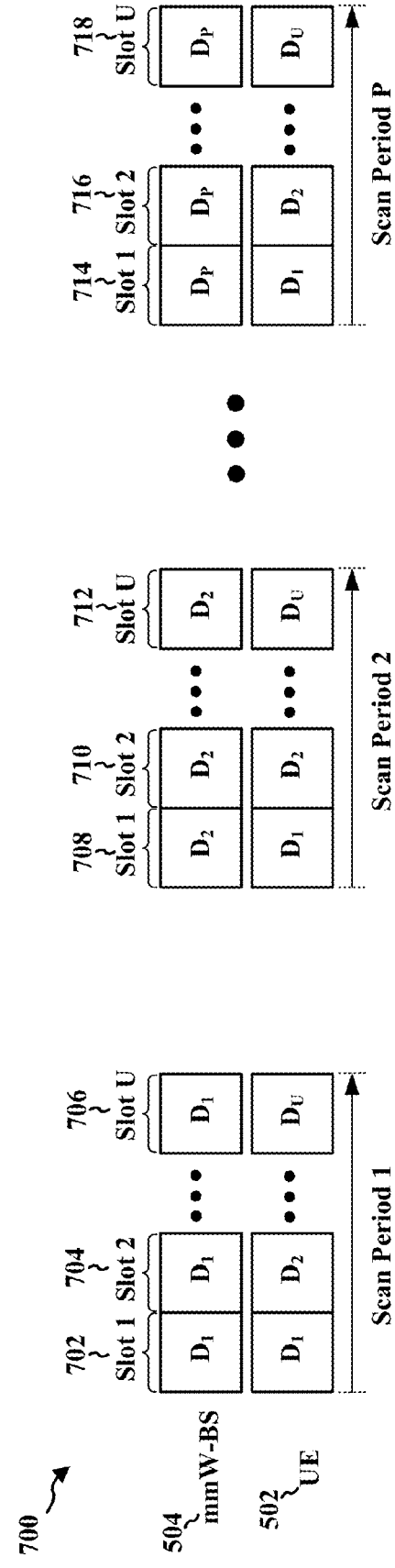
FIG. 7 is a diagram illustrating an example scanning operation for a UE and an mmW-BS.

FIG. 7 is a diagram illustrating an example frame structure 700 for a scanning operation of the UE 502 and the mmW-BS 504. In the aspect of FIG. 7, the UE 502 and the mmW-BS 504 may each have a single RF chain. As shown in FIG. 7, the mmW-BS 504 may transmit a beam in a single direction (e.g., direction "$D_1$") during each of a number of time slots (e.g., slot 1 702, slot 2 704, . . . , slot U 706). As further shown in FIG. 7, the UE 502 may scan each of its U number of possible directions (e.g., directions "$D_1$" to "$D_U$") during each of the corresponding time slots (e.g., slot 1 702, slot 2 704, . . . , slot U 706) to determine the best path for the beam from the mmW-BS 504. For example, each of the time slots (e.g., slot 1 702, slot 2 704, . . . , slot U 706) may have the same duration. In such example, the duration of scan period 1 in FIG. 7 may be equivalent to the total of the U time slots required for the UE 502 to scan each of its U directions.

The mmW-BS 504 may subsequently transmit a beam in another direction (e.g., direction "$D_2$") while the UE 502 scans each of its U number of possible directions to determine the best path for the beam from the mmW-BS 504. As shown in FIG. 7, the mmW-BS 504 may transmit a beam in a single direction (e.g., direction "$D_2$") during each of a number of time slots (e.g., slot 1 708, slot 2 710, . . . , slot U 712). As further shown in FIG. 7, the UE 502 may scan each of its U number of possible directions (e.g., directions "$D_1$" to "$D_U$") during each of the corresponding time slots (e.g., slot 1 708, slot 2 710, . . . , slot U 712) to determine the best path for the beam from the mmW-BS 504. For example, each of the time slots (e.g., slot 1 708, slot 2 710, . . . , slot U 712) may have the same duration. In such example, the duration of scan period 2 in FIG. 7 may be equivalent to the total of the U time slots required for the UE 502 to scan each of its U directions.

The mmW-BS 504 may transmit beams in the last direction of its P number of possible directions in a manner similar to the transmissions previously discussed with respect to the scan periods 1 and 2 in FIG. 7. For example, the mmW-BS 504 may transmit a beam in the last of its possible directions (e.g., direction "$D_P$") during each of the corresponding time slots (e.g., slot 1 714, slot 2 716, . . . slot U 718). As further shown in FIG. 7, the UE 502 may scan each of its U number of possible directions (e.g., directions "$D_1$" to "$D_U$") during each of the corresponding time slots (e.g., slot 1 714, slot 2 716, . . . , slot U 718) to determine the best path for the beam from the mmW-BS 504. For example, each of the time slots (e.g., slot 1 714, slot 2 716, . . . , slot U 718) may have the same duration. In such example, the duration of scan period P in FIG. 7 may be equivalent to the total of the U time slots required for the UE 502 to scan each of its U directions.

In an aspect, the frame structure 600 in FIG. 6 may be preferred over the frame structure 700 in FIG. 7 in a scenario where the RF beam switching speed of the mmW-BS 504 is greater than the RF beam switching speed of the UE 502. Alternately, the frame structure 700 in FIG. 7 may be preferred over the frame structure 600 in FIG. 6 in a scenario where the RF beam switching speed of the UE 502 is greater than the RF beam switching speed of the mmW-BS 504.

Figure 8:
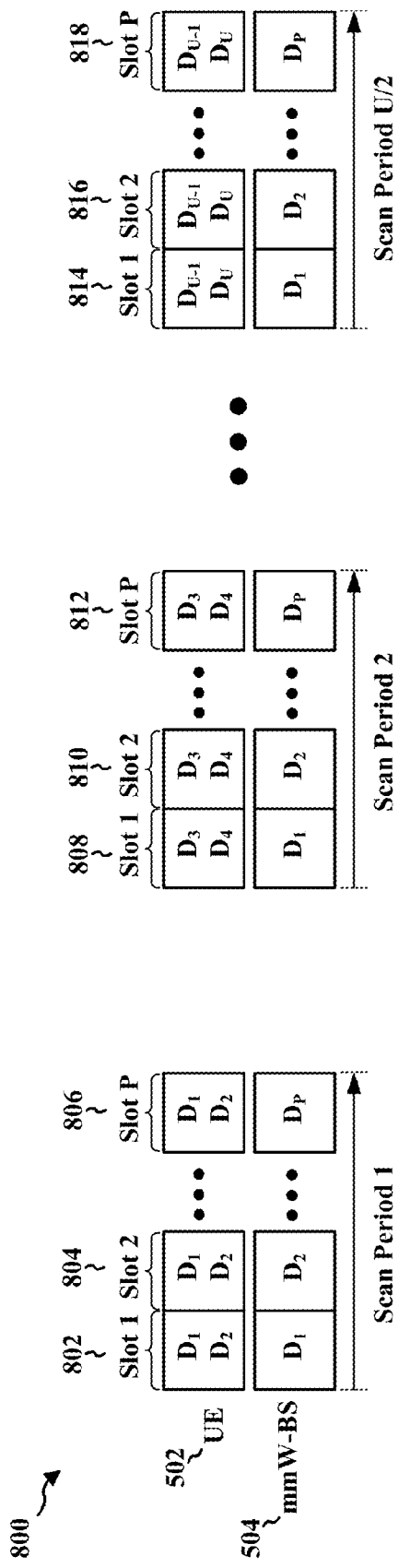
FIG. 8 is a diagram illustrating an example scanning operation for a UE and an mmW-BS.

FIG. 8 is a frame structure 800 illustrating an example scanning operation for the UE 502 and the mmW-BS 504. In the aspect of FIG. 8, the UE 502 may have multiple antenna sub-arrays (e.g., two antenna sub-arrays) and the mmW-BS 504 may have a single RF chain. Accordingly, the multiple antenna sub-arrays of the UE 502 may enable the UE 502 to concurrently transmit multiple beams in a time slot. In the example of FIG. 8, the UE 502 may be configured with two antenna sub-arrays enabling the UE 502 to concurrently transmit two beams in two different directions in a time slot. For example, each beam transmitted from the UE 502 may include corresponding uplink RACH signals.

As shown in FIG. 8, the UE 502 may concurrently transmit two beams in two different directions (e.g., a first beam in direction "$D_1$" and a second beam in direction "$D_2$") during each of a number of time slots (e.g., slot 1 802, slot 2 804, . . . , slot P 806). As further shown in FIG. 8, the mmW-BS 504 may scan each of its P number of possible directions (e.g., directions "$D_1$" to "$D_P$") during each of the corresponding time slots (e.g., slot 1 802, slot 2 804, . . . , slot P 806) to determine the best path for the beams from the UE 502. For example, each of the time slots may have the same duration. In such example, the duration of scan period 1 in FIG. 8 may be equivalent to the total of the P time slots required for the mmW-BS 504 to scan each of its P directions. As such, the beamforming capabilities may include an indication of the length of the mmW-BS's scan period in order for the UE to determine when to begin transmitting beams on the next set of directions (e.g. "$D_3$" and "$D_4$").

The UE 502 may then concurrently transmit two beams in two other directions (e.g., a third beam in direction "$D_3$" and a fourth beam in direction "$D_4$") while the mmW-BS 504 scans each of its P number of possible directions to determine the best path for the beams from the UE 502. As shown in FIG. 8, the UE 502 may concurrently transmit two beams in different directions (e.g., directions "$D_3$" and "$D_4$") during each of a number of time slots (e.g., slot 1 808, slot 2 810, ..., slot P 812). As further shown in FIG. 8, the mmW-BS 504 may scan each of its P number of possible directions (e.g., directions "$D_1$" to "$D_P$") during each of the corresponding time slots (e.g., slot 1 808, slot 2 810, ..., slot P 812) to determine the best path for the beams from the UE 502. For example, each of the time slots may have the same duration. In such example, the duration of scan period 2 in FIG. 8 may be equivalent to the duration of the P time slots required for the mmW-BS 504 to scan each of its P directions.

The UE 502 may transmit beams in the last two directions of its U number of possible directions in a manner similar to the transmissions previously discussed with respect to the scan periods 1 and 2 in FIG. 8. For example, the UE 502 may concurrently transmit two beams in the last of its possible directions (e.g., directions "$D_{U-1}$" and "$D_U$") during each of the corresponding time slots (e.g., slot 1 814, slot 2 816, ..., slot P 818). As further shown in FIG. 8, the mmW-BS 504 may scan each of its P number of possible directions (e.g., directions "$D_1$" to "$D_P$") during each of the corresponding time slots (e.g., slot 1 814, slot 2 816, ..., slot P 818) to determine the best path for the beams from the UE 502. For example, each of the time slots may have the same duration. In such example, the duration of scan period U/2 in FIG. 8 may be equivalent to the total of the P time slots required for the mmW-BS 504 to scan each of its P directions.

In the aspect of FIG. 8, by aligning the structure of the uplink RACH signals to correspond to the antenna sub-array of the UE 502 that is more frequently used (relative to the antenna sub-array that is most likely to be blocked), the time required to complete the synchronization procedure may be reduced since the link from the mmW-BS 504 to the UE 502 may be established with minimal loss and with a higher probability.

Figure 9:
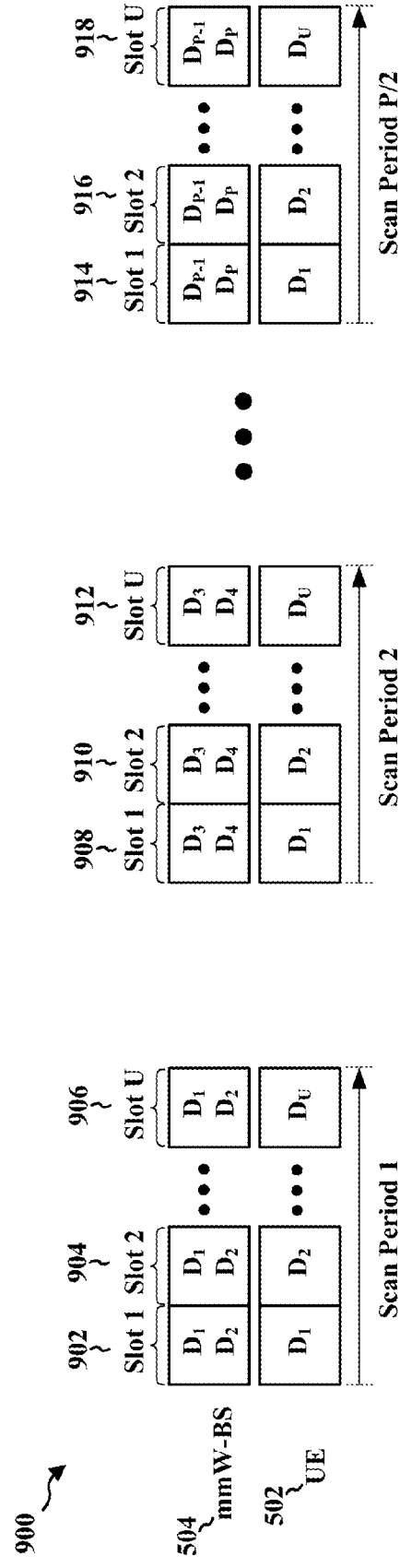
FIG. 9 is a diagram illustrating an example scanning operation for a UE and an mmW-BS.

FIG. 9 is a frame structure 900 illustrating an example scanning operation for the UE 502 and the mmW-BS 504. In an aspect, the mmW-BS 504 may have digital beamforming capability with an NK number of RF chains and the UE 502 may have one RF chain (e.g., the UE 502 has an analog/RF beamformer) or at best two RF chains (e.g., the UE 502 has a hybrid beamformer). In the example configuration of FIG. 9, the mmW-BS 504 has a digital beamforming capability with 2 RF chains enabling the mmW-BS 504 to concurrently transmit two beams in two different directions in a time slot.

As shown in FIG. 9, the mmW-BS 504 may concurrently transmit two beams in two different directions (e.g., a first beam in direction "$D_1$" and a second beam in direction "$D_2$") during each of a number of time slots (e.g., slot 1 902, slot 2 904, ..., slot P 906). As further shown in FIG. 9, the UE 502 may scan each of its U number of possible directions (e.g., directions "$D_1$" to "$D_U$") during each of the corresponding time slots (e.g., slot 1 902, slot 2 904, ..., slot U 906) to determine the best path for the beams from the mmW-BS 504. For example, each of the time slots may have the same duration. In such example, the duration of scan period 1 in FIG. 9 may be equivalent to the total of the U time slots required for the UE 502 to scan each of its U directions. As such, the beamforming capabilities may include an indication of the length of the UE's scan period in order for the mmW-BS to determine when to begin transmitting beams on the next set of directions (e.g. "$D_3$" and "$D_4$").

The mmW-BS 504 may then concurrently transmit two beams in two other directions (e.g., a third beam in direction "$D_3$" and a fourth beam in direction "$D_4$") while the UE 502 scans each of its U number of possible directions to determine the best path for the beams from the mmW-BS 504. As shown in FIG. 9, the mmW-BS 504 may concurrently transmit two beams in different directions (e.g., directions "$D_3$" and "$D_4$") during each of a number of time slots (e.g., slot 1 908, slot 2 910, ..., slot U 912). As further shown in FIG. 9, the UE 502 may scan each of its U number of possible directions (e.g., directions "$D_1$" to "$D_U$") during each of the corresponding time slots (e.g., slot 1 908, slot 2 910, ..., slot P 912) to determine the best path for the beams from the mmW-BS 504. For example, each of the time slots may have the same duration. In such example, the duration of scan period 2 in FIG. 9 may be equivalent to the duration of the U time slots required for the UE 502 to scan each of its U directions.

The mmW-BS 504 may transmit beams in the last two directions of its P number of possible directions in a manner similar to the transmissions previously discussed with respect to the scan periods 1 and 2 in FIG. 9. For example, the mmW-BS 504 may concurrently transmit two beams in the last of its possible directions (e.g., directions "$D_{P-1}$" and "$D_P$") during each of the corresponding time slots (e.g., slot 1 914, slot 2 916, ..., slot U 918). As further shown in FIG. 9, the UE 502 may scan each of its U number of possible directions (e.g., directions "$D_1$" to "$D_U$") during each of the corresponding time slots (e.g., slot 1 914, slot 2 916, ..., slot P 918) to determine the best path for the beams from the mmW-BS 504. For example, each of the time slots may have the same duration. In such example, the duration of scan period P/2 in FIG. 9 may be equivalent to the total of the U time slots required for the UE 502 to scan each of its U directions.

With reference to FIGS. 6 and 8, it can be appreciated that the UE 502 configured with one RF chain transmits beams in four possible directions (e.g., U=4), four scan periods (one scan period per direction) would be required to cover all four directions (e.g., directions "$D_1$" to "$D_4$") of the UE 502. In the aspect of FIG. 8, however, when the UE 502 configured with two antenna sub-arrays transmits beams in four possible directions (e.g., U=4), two scan periods (one scan period per two directions) would be required to cover all four directions (e.g., directions "$D_1$" to "$D_4$") of the UE 502. Therefore, if the time slots in FIGS. 6 and 8 are configured to be equal in duration, the scanning operation in the aspect of FIG. 8 will require half the number of scanning periods as required in the aspect of FIG. 6 to scan all possible directions of the UE 502.

With reference to FIGS. 7 and 9, it can be appreciated that the multiple RF chains of the mmW-BS 504 in the aspect of FIG. 9 may reduce the time required to perform the synchronization procedure, since the multiple RF chains enable the mmW-BS 504 to concurrently search multiple directions. For example, in the aspect of FIG. 7, when the mmW-BS 504 configured with one RF chain transmits beams in four possible directions (e.g., P=4), four scan periods (one scan period per direction) would be required to cover all four directions (e.g., directions "$D_1$" to "$D_4$") of the mmW-BS 504. In the aspect of FIG. 9, however, the mmW-BS 504 configured with two RF chains transmits beams in four possible directions (e.g., P=4), two scan periods (one scan period per two directions) would be required to cover all four directions (e.g., directions "D₁" to "D₄") of the mmW-BS 504. Therefore, if the time slots in FIGS. 7 and 9 are configured to be equal in duration, the scanning operation in the aspect of FIG. 9 will require half the number of scanning periods as required in the aspect of FIG. 7 to scan all possible directions of the mmW-BS 504.

Figure 10:
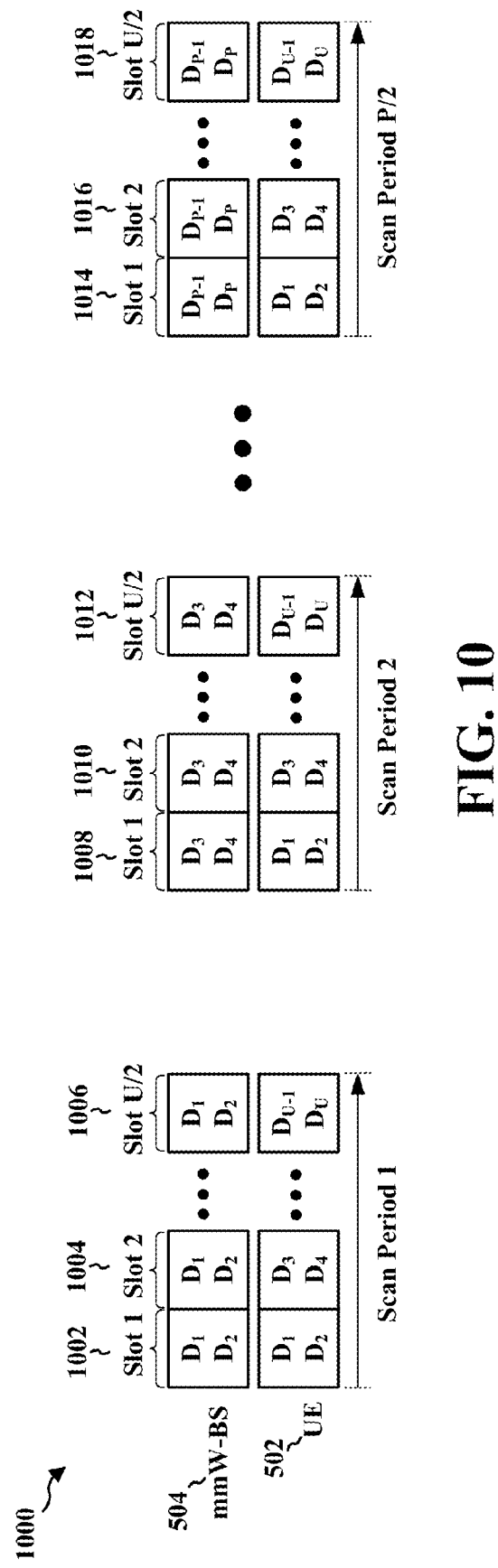
FIG. 10 is a diagram illustrating an example scanning operation for a UE and an mmW-BS.

FIG. 10 is a frame structure 1000 illustrating an example scanning operation for the UE 502 and the mmW-BS 504. In the configuration of FIG. 10, the UE 502 may have multiple antenna sub-arrays and the mmW-BS 504 may have digital beamforming capability. As shown in FIG. 10, the mmW-BS 504 may transmit beams in a P number of possible directions (e.g., directions "D₁" to "D_P") by concurrently transmitting two beams in two different directions (e.g., a first beam in direction "D₁" and a second beam in direction "D₂") during each of the corresponding time slots (e.g., slot 1 1002, slot 2 1004, . . . , slot U/2 1006) of a scan period. As further shown in FIG. 10, the UE 502 may scan two different directions (e.g., direction "D₁" and direction "D₂" in a first time slot, direction "D₃" and direction "D₄" in a second time slot, and so on) of its U number of possible directions during each of the corresponding time slots (e.g., slot 1 1002, slot 2 1004, . . . , slot U/2 1006) to determine the best path for the beams from the mmW-BS 504. For example, each of the time slots may have the same duration. In such example, the duration of scan period 1 in FIG. 10 may be equivalent to the total of the U/2 time slots required for the mmW-BS 504 to transmit beams for each of its P directions.

As further shown in FIG. 10, the mmW-BS 504 may concurrently transmit two beams in two different directions (e.g., a first beam in direction "D₃" and a second beam in direction "D₄") during each of the corresponding time slots (e.g., slot 1 1008, slot 2 1010, . . . , slot U/2 1012). As further shown in FIG. 10, the UE 502 may scan two different directions (e.g., direction "D₁" and direction "D₂" in a first time slot, direction "D₃" and direction "D₄" in a second time slot, and so on) of its U number of possible directions during each of the corresponding time slots (e.g., slot 1 1008, slot 2 1010, . . . , slot U/2 1012) to determine the best path for the beams from the mmW-BS 504. For example, each of the time slots may have the same duration. In such example, the duration of scan period 2 in FIG. 10 may be equivalent to the total of the U/2 time slots required for the mmW-BS 504 to transmit beams for each of its P directions.

As shown in FIG. 10, the mmW-BS 504 may transmit beams in each direction of its P number of possible directions by concurrently transmitting two beams in two different directions (e.g., a first beam in direction "D_{P-1}" and a second beam in direction "D_P") during each of the corresponding time slots (e.g., slot 1 1014, slot 2 1016, . . . , slot U/2 1016). As further shown in FIG. 10, the UE 502 may scan two different directions (e.g., direction "D₁" and direction "D₂" in a first time slot, direction "D₃" and direction "D₄" in a second time slot, and so on) of its U number of possible directions during each of the corresponding time slots (e.g., slot 1 1014, slot 2 1016, . . . , slot U/2 1018) to determine the best path for the beams from the mmW-BS 504. For example, each of the time slots may have the same duration. In such example, the duration of scan period P/2 in FIG. 10 may be equivalent to the total of the U/2 time slots required for the UE 502 to scan each of its U directions.

In an aspect, independent of any capability at the mmW-BS 504 or the UE 502, once the UE 502 determines the best beam (e.g., beam i for the mmW-BS 504 and beam j for the UE 502), the UE 502 may signal this information to the mmW-BS 504 through the RACH.

In an aspect, the frame structure 1000 may be reconfigured to significantly reduce the latency in the initial discovery process for a UE (e.g., UE 502) having the benefit of better signal quality than other UEs. For example, such UE having the benefit of better signal quality may be located approximately at the center of a cell while the other UEs are located at the edge of the cell). In such aspect, a subset of the N_B sectors may be aligned at the mmW-BS 504 sequentially followed by a RACH (if needed) from the UE 502 for one of these sectors. By appropriately selecting the first subset to be the most likely directions for beamforming signaling for the user concerned, the latency in the initial discovery process can be reduced significantly with high probability.

Figure 11:
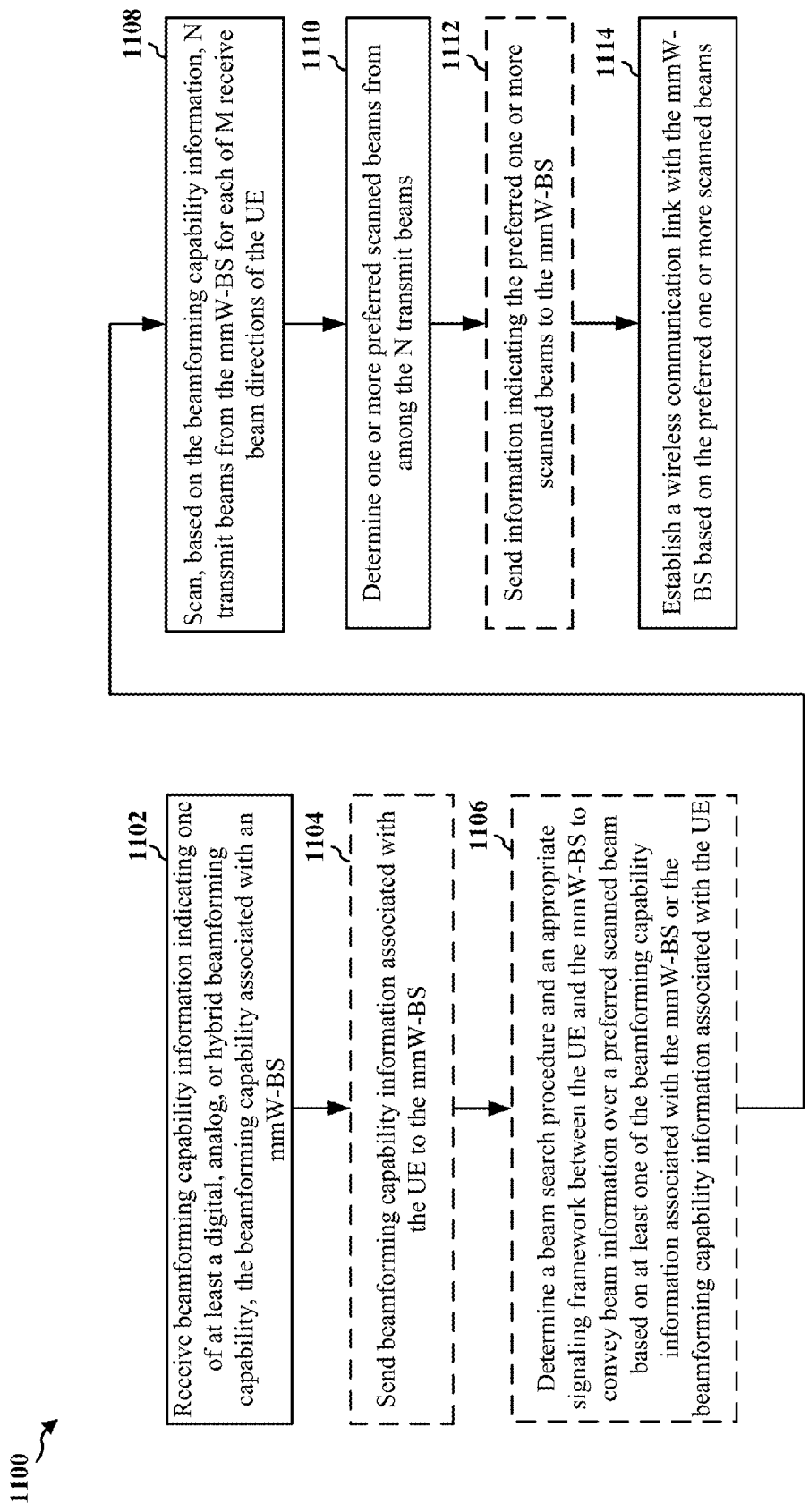
FIG. 11 is a flow chart of a method of wireless communication.

FIG. 11 is a flow chart 1100 of a method of wireless communication. The method may be performed by a UE (e.g., the UE 502, the apparatus 1202/1202'). It should be noted that the blocks indicated with dotted lines in FIG. 11 (e.g., blocks 1104, 1106, and 1112) represent optional blocks.

At block 1102, the UE receives beamforming capability information indicating one of at least a digital, analog, or hybrid beamforming capability, the beamforming capability associated with an mmW-BS. For example, with reference to FIG. 5, the beamforming information may be received from the mmW-BS 504 and may include information indicating one of at least a digital, analog, or hybrid beamforming capability of the mmW-BS 504. As another example, the beamforming information may include information indicating an RF beam switching speed (also referred to as an antenna switching speed) of the mmW-BS 504.

At block 1104, the UE sends beamforming capability information associated with the UE to the mmW-BS. In an aspect, the beamforming capability information associated with the UE indicates that the UE includes multiple antenna sub-arrays. In an aspect, the beamforming capability information associated with the UE may indicate a number of antennas, a number of antenna sub-arrays, a type of sub-arrays (linear, planar, etc.), a beamformer architecture types (e.g., digital, analog/RF, hybrid), and/or a transmit power. In another aspect, the beamforming capability information indicates an RF beam switching speed (also referred to as an antenna switching speed) of the UE.

At block 1106, the UE determines a beam search procedure and an appropriate signaling framework between the UE and the mmW-BS to convey beam information over the preferred scanned beam based on the beamforming capability information associated with the mmW-BS and/or the beamforming capability information associated with the UE. For example, if the UE 502 has multiple antenna sub-arrays and the mmW-BS 504 has analog beamforming capability and faster antenna switching than the UE 502, the UE 502 may determine to apply the beam search procedure of FIG. 8 to leverage the capabilities of the UE 502 and mmW-BS 504 to reduce the time required to complete the scanning. As another example, if the UE 502 has multiple antenna sub-arrays and the mmW-BS 504 has digital beamforming capability information, the UE may determine to apply the beam search procedure of FIG. 10 to leverage the capabilities of the UE 502 and mmW-BS 504 to reduce the time required to complete the scanning.

At block 1108, the UE scans, based on the beamforming capability information, N transmit beams from the mmW-BS for each of M receive beam directions of the UE. In an aspect, the scanning by the UE includes configuring antenna weights and/or a phase and amplitude for the N transmit beams. In an aspect, the scanning of the N transmit beams comprises scanning the N transmit beams using the plurality of antenna sub-arrays in the time slot. In an aspect, the scanning by the UE is further based on the beamforming capability information associated with the UE. In an aspect, the scanning by the UE is performed according to the determined beam search procedure.

At block 1110, the UE determines one or more preferred scanned beams from among the N transmit beams. In an aspect, the UE determines the one or more preferred scanned beams by comparing a signal quality of the scanned beams to a threshold.

At block 1112, the UE sends information indicating the preferred one or more scanned beams to the mmW-BS.

Finally, at block 1114, the UE establishes a wireless communication link with the mmW-BS based on the preferred one or more scanned beams.

Figure 12:
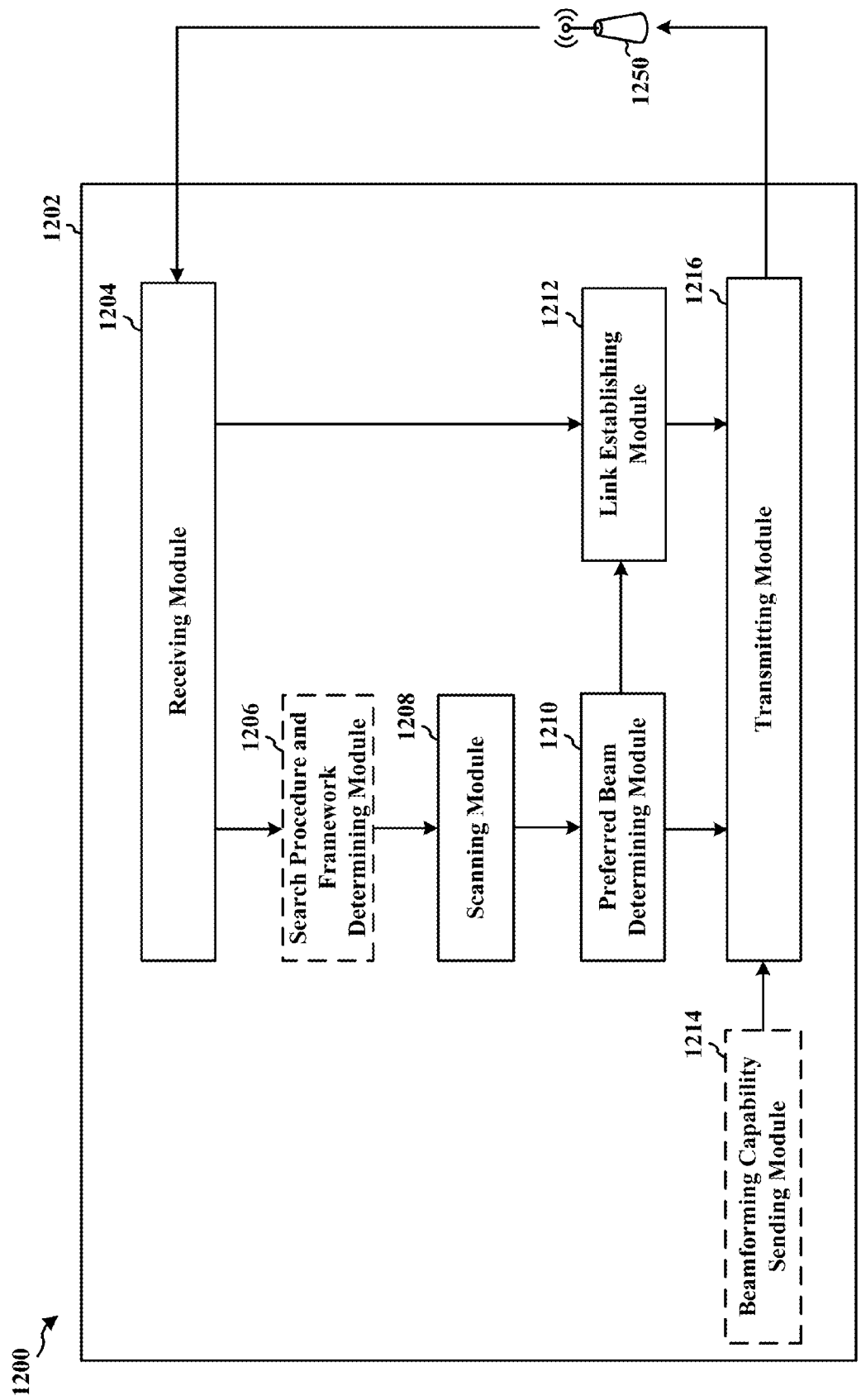
FIG. 12 is a data flow diagram illustrating the data flow between different modules/means/components in an exemplary apparatus.

FIG. 12 is a conceptual data flow diagram 1200 illustrating the data flow between different modules/means/components in an exemplary apparatus 1202. The apparatus may be a UE. The apparatus includes a module 1204 that receives beamforming capability information indicating one of at least a digital, analog, or hybrid beamforming capability, the beamforming capability associated with an mmW-BS, a module 1206 that determines a beam search procedure and an appropriate signaling framework between the UE and the mmW-BS to convey beam information over the preferred scanned beam based on at least one of the beamforming capability information associated with the mmW-BS or the beamforming capability information associated with the UE, a module 1208 that scans, based on the beamforming capability information, N transmit beams from the mmW-BS for each of M receive beam directions of the UE, a module 1210 that determines one or more preferred scanned beams from among the N transmit beams, a module 1212 that establishes a wireless communication link with the mmW-BS based on the preferred one or more scanned beams, a module 1214 that sends beamforming capability information associated with the UE to the mmW-BS, wherein the scanning is further based on the beamforming capability information associated with the UE, and a module 1216 that sends information indicating the preferred one or more scanned beams to the mmW-BS. In an aspect, the module 1208 performs the scanning is according to the determined beam search procedure.

The apparatus may include additional modules that perform each of the blocks in the aforementioned flow chart of FIG. 11. As such, each block in the aforementioned flow chart of FIG. 11 may be performed by a module and the apparatus may include one or more of those modules. The modules may be one or more hardware components specifically configured to carry out the stated processes implemented by a processor configured to perform the stated processes, stored within a computer-readable medium for implementation by a processor, or some combination thereof.

Figure 13:
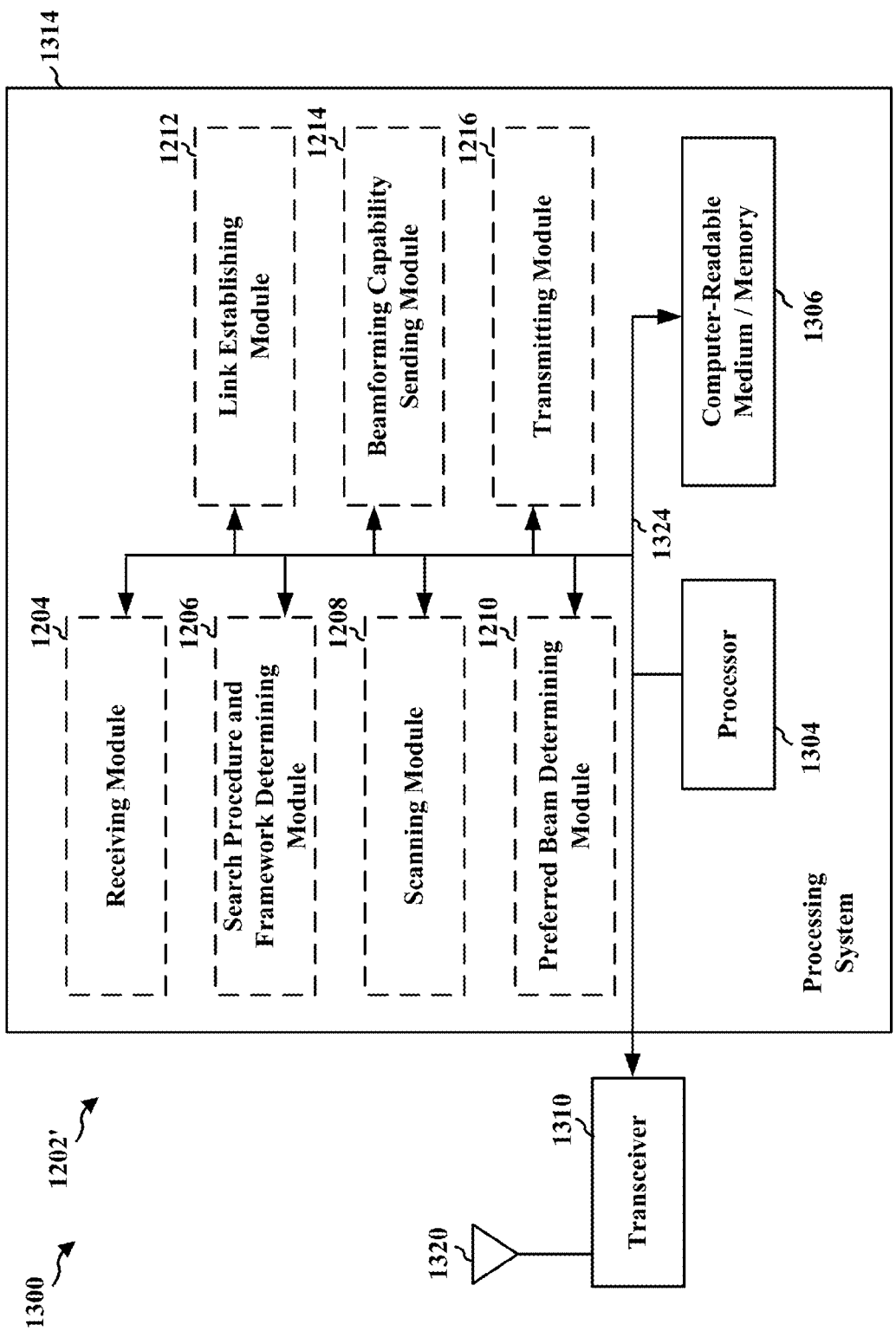
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware modules, represented by the processor 1304, the modules 1204, 1206, 1208, 1210, 1212, 1214, and 1216, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the receiving module 1204. In addition, the transceiver 1310 receives information from the processing system 1314, specifically the transmitting module 1216, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system further includes at least one of the modules 1204, 1206, 1208, 1210, 1212, 1214, and 1216. The modules may be software modules running in the processor 1304, resident/stored in the computer readable medium/memory 1306, one or more hardware modules coupled to the processor 1304, or some combination thereof. The processing system 1314 may be a component of the UE 350 and may include the memory 360 and/or at least one of the TX processor 368, the RX processor 356, and the controller/processor 359.

In one configuration, the apparatus 1202/1202' for wireless communication includes means for receiving beamforming capability information indicating one of at least a digital, analog, or hybrid beamforming capability, the beamforming capability associated with a millimeter wave base station (mmW-BS), means for scanning, based on the beamforming capability information, N transmit beams from the mmW-BS for each of M receive beam directions of the UE, means for determining one or more preferred scanned beams from among the N transmit beams, means for establishing a wireless communication link with the mmW-BS based on the preferred one or more scanned beams, means for sending information indicating the preferred one or more scanned beams to the mmW-BS, means for sending beamforming capability information associated with the UE to the mmW-BS, where the scanning is further based on the beamforming capability information associated with the UE, means for determining a beam search procedure and an appropriate signaling framework between the UE and the mmW-BS to convey beam information over the preferred scanned beam based on at least one of the beamforming capability information associated with the mmW-BS or the beamforming capability information associated with the UE, where the scanning is performed according to the determined beam search procedure. The aforementioned means may be one or more of the aforementioned modules of the apparatus 1202 and/or the processing system 1314 of the apparatus 1202' configured to perform the functions recited by the aforementioned means. As described supra, the processing system 1314 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flow charts disclosed is an illustration of exemplary approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication for a user equipment (UE), comprising:
   receiving beamforming capability information indicating one of at least a digital, analog, or hybrid beamforming capability, and including an RF beam switching speed, the beamforming capability being associated with a millimeter wave base station (mmW-BS);
   scanning, based on the beamforming capability information including the RF beam switching speed, N transmit beams from the mmW-BS for each of M receive beam directions of the UE, the scanning including selecting a frame structure for the scanning based on the RF beam switching speed of the mmW-BS;
   determining one or more preferred scanned beams from among the N transmit beams; and
   establishing a wireless communication link with the mmW-BS based on the preferred one or more scanned beams.

2. The method of claim 1, further comprising sending information indicating the preferred one or more scanned beams to the mmW-BS.

3. The method of claim 1, further comprising sending beamforming capability information associated with the UE to the mmW-BS, wherein the scanning is further based on the beamforming capability information associated with the UE.

4. The method of claim 3, further comprising determining a beam search procedure and an appropriate signaling framework between the UE and the mmW-BS to convey beam information over the preferred scanned beam based on at least one of the beamforming capability information associated with the mmW-BS or the beamforming capability information associated with the UE, wherein the scanning is performed according to the determined beam search procedure and the frame structure for the scanning corresponds to the determined beam search procedure.

5. The method of claim 3, wherein:
   the beamforming capability information associated with the UE indicates that the UE comprises a plurality of antenna sub-arrays, and
   the scanning of the N transmit beams comprises scanning the N transmit beams using the plurality of antenna sub-arrays in a time slot.

6. The method of claim 1, wherein the scanning comprises configuring antenna weights and/or a phase and amplitude for the N transmit beams.

7. The method of claim 1, wherein determining the one or more preferred scanned beams comprises comparing a signal quality of the scanned beams to a threshold.

8. A user equipment (UE) for wireless communication, comprising:
   means for receiving beamforming capability information indicating one of at least a digital, analog, or hybrid beamforming capability, and including an RF beam switching speed, the beamforming capability associated with a millimeter wave base station (mmW-BS);
   means for scanning, based on the beamforming capability information including the RF beam switching speed, N transmit beams from the mmW-BS for each of M receive beam directions of the UE, the scanning including selecting a frame structure for the scanning based on the RF beam switching speed of the mmW-BS;
   means for determining one or more preferred scanned beams from among the N transmit beams; and
   means for establishing a wireless communication link with the mmW-BS based on the preferred one or more scanned beams.

9. The UE of claim 8, further comprising means for sending information indicating the preferred one or more scanned beams to the mmW-BS.

10. The UE of claim 8, further comprising means for sending beamforming capability information associated with the UE to the mmW-BS, wherein the scanning is further based on the beamforming capability information associated with the UE.

11. The UE of claim 10, further comprising means for determining a beam search procedure and an appropriate signaling framework between the UE and the mmW-BS to convey beam information over the preferred scanned beam based on at least one of the beamforming capability information associated with the mmW-BS or the beamforming capability information associated with the UE, wherein the scanning is performed according to the determined beam search procedure and the frame structure for the scanning corresponds to the determined beam search procedure.

12. The UE of claim 10, wherein:
the beamforming capability information associated with the UE indicates that the UE comprises a plurality of antenna sub-arrays, and
the scanning of the N transmit beams comprises scanning the N transmit beams using the plurality of antenna sub-arrays in a time slot.

13. The UE of claim 8, wherein the scanning comprises configuring antenna weights and/or a phase and amplitude for the N transmit beams.

14. The UE of claim 8, wherein determining the one or more preferred scanned beams comprises comparing a signal quality of the scanned beams to a threshold.

15. A user equipment (UE) for wireless communication, comprising:
a memory; and
at least one processor coupled to the memory and configured to:
receive beamforming capability information indicating one of at least a digital, analog, or hybrid beamforming capability, and including an RF beam switching speed, the beamforming capability associated with a millimeter wave base station (mmW-BS);
scan, based on the beamforming capability information including the RF beam switching speed, N transmit beams from the mmW-BS for each of M receive beam directions of the UE, the at least one processor being further configured to select a frame structure for the scan based on the RF beam switching speed of the mmW-BS, as part of being configured to scan;
determine one or more preferred scanned beams from among the N transmit beams; and
establish a wireless communication link with the mmW-BS based on the preferred one or more scanned beams.

16. The UE of claim 15, wherein the at least one processor is further configured to send information indicating the preferred one or more scanned beams to the mmW-BS.

17. The UE of claim 15, wherein the at least one processor is further configured to send beamforming capability information associated with the UE to the mmW-BS, wherein the scanning is further based on the beamforming capability information associated with the UE.

18. The UE of claim 17, wherein the at least one processor is further configured to determine a beam search procedure and an appropriate signaling framework between the UE and the mmW-BS to convey beam information over the preferred scanned beam based on at least one of the beamforming capability information associated with the mmW-BS or the beamforming capability information associated with the UE, wherein the scanning is performed according to the determined beam search procedure and the frame structure for the scanning corresponds to the determined beam search procedure.

19. The UE of claim 17, wherein:
the beamforming capability information associated with the UE indicates that the UE comprises a plurality of antenna sub-arrays, and
the scanning of the N transmit beams comprises scanning the N transmit beams using the plurality of antenna sub-arrays in a time slot.

20. The UE of claim 15, wherein the scanning comprises configuring antenna weights and/or a phase and amplitude for the N transmit beams.

21. The UE of claim 15, wherein determining the one or more preferred scanned beams comprises comparing a signal quality of the scanned beams to a threshold.

22. A non-transitory computer-readable medium comprising code that when executed by at least one processor causes the at least one processor to:
receive beamforming capability information indicating one of at least a digital, analog, or hybrid beamforming capability, and including an RF beam switching speed, the beamforming capability associated with a millimeter wave base station (mmW-BS);
scan, based on the beamforming capability information including the RF beam switching speed, N transmit beams from the mmW-BS for each of M receive beam directions of the UE, the scanning including selecting a frame structure for the scanning based on the RF beam switching speed of the mmW-BS;
determine one or more preferred scanned beams from among the N transmit beams; and
establish a wireless communication link with the mmW-BS based on the preferred one or more scanned beams.

23. The non-transitory computer-readable medium of claim 22, further comprising code that when executed by the at least one processor causes the at least one processor to send information indicating the preferred one or more scanned beams to the mmW-BS.

24. The non-transitory computer-readable medium of claim 22, further comprising code that when executed by the at least one processor causes the at least one processor to send beamforming capability information associated with the UE to the mmW-BS, wherein the scanning is further based on the beamforming capability information associated with the UE.

25. The non-transitory computer-readable medium of claim 24, further comprising code that when executed by the at least one processor causes the at least one processor to determine a beam search procedure and an appropriate signaling framework between the UE and the mmW-BS to convey beam information over the preferred scanned beam based on at least one of the beamforming capability information associated with the mmW-BS or the beamforming capability information associated with the UE, wherein the scanning is performed according to the determined beam search procedure and the frame structure for the scanning corresponds to the determined beam search procedure.

26. The non-transitory computer-readable medium of claim 24, wherein:
the beamforming capability information associated with the UE indicates that the UE comprises a plurality of antenna sub-arrays, and
the scanning of the N transmit beams comprises scanning the N transmit beams using the plurality of antenna sub-arrays in a time slot.

27. The non-transitory computer-readable medium of claim 22, wherein the scanning comprises configuring antenna weights and/or a phase and amplitude for the N transmit beams.

28. The non-transitory computer-readable medium of claim 22, wherein determining the one or more preferred scanned beams comprises comparing a signal quality of the scanned beams to a threshold.

* * * * *